2,937,996

SYNTHETIC LUBRICANTS

Samuel R. Pethrick and Maurice Barrington Sparke, Sunbury-on-Thames, and Stuart Walter Critchley, Cheshire, England; said Pethrick and said Sparke assignors to The British Petroleum Company, Limited, London, England, a British joint-stock corporation No Drawing. Filed Mar. 2, 1956, Ser. No. 568,979

Claims priority, application Great Britain Mar. 4, 1955

4 Claims. (Cl. 252—57)

This invention relates to synthetic lubricants and has among its objects to provide a lubricant suitable for use in aero gas turbines. To be suitable for such use, a lubricant must have a viscosity index high enough to give sufficient lubrication over a wide range of temperatures, while the pour point must be low in view of the fact that low temperatures may be encountered in use.

According to the invention there is provided a blend, comprising a diester and a complex ester, suitable for use as a lubricant, in which the diester is a liquid aliphatic diester of a saturated aliphatic dicarboxylic acid and the complex ester has the formula:

$$ROOCR_1COO(R_2OOCR_1COO)_nR$$

where R is the residue of an aliphatic alcohol, $R_1$ is the residue of an aliphatic or aromatic dicarboxylic acid, $R_2$ is the residue of a glycol or a polyglycol and $n$ is an integer greater than one.

It is to be understood that residues of different alcohols, acids and glycols or polyglycols may be present in the same molecule of the complex ester and that mixtures of complex esters of the above general formula may be used in the blend, and also mixtures of diesters.

A complex ester for use in the lubricant according to the invention may be prepared by reacting in one or more stages suitable proportions of an aliphatic dicarboxylic acid and/or an aromatic dicarboxylic acid, a glycol or polyglycol and an alcohol. The aliphatic dicarboxylic acid should preferably be one having more than four carbon atoms in the molecule.

In order to produce a complex ester of the formula:

$$ROOCR_1COO(R_2OOCR_1COO)_nR$$

it is necessary to mix the alcohol, acid and glycol or polyglycol in the following approximate molecular proportions:

ROH _____ 2
$R_1(COOH)_2$ _____ $n+1$
$R_2(OH)_2$ _____ $n$

Instead of using the acids themselves the anhydrides of acids (where they exist) may be used in substitution for part or all of the acids e.g. phthalic anhydride instead of phthalic acid. It is to be understood that mixtures of complex esters of the above formula may be used in the lubricant blend i.e. esters having different values of $n$ and having different alcohol, acid and glycol or polyglycol residues in the same molecule. With such a mixture the average value of $n$ would not necessarily, of course, be a whole number. Thus when preparing a complex ester mixture the molecular proportions of the ingredients to be reacted need not be present in whole number ratios, but in order to obtain compounds in which $n$ is greater than one it is necessary to use a molecular proportion of alcohol(s) which is less than the molecular proportion of dicarboxylic acid(s) and preferably not greater than the molecular proportion of glycol(s), and a molecular proportion of glycol(s) which is more than half the molecular proportion of dicarboxylic acid(s), most suitably at least two thirds of the molecular proportion of dicarboxylic acids, even approaching an equi-molecular proportion.

Particularly effective complex esters have been found to be those in which R is the residue of 2-ethyl hexyl alcohol, i.e.

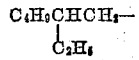

$R_1$ is the residue of sebacic acid, i.e. —$(CH_2)_8$—, or phthalic acid, i.e. >$C_6H_4$, $R_2$ is the residue of propylene glycol, i.e.

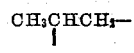

and $n$ has a value in the range 2–10.

Such complex esters may be prepared by reacting together suitable molecular proportions of sebacic acid, phthalic anhydride, propylene glycol and 2-ethyl hexyl alcohol. For example, a complex ester in which $n=5$, or a mixture of complex esters in which $n$ has an average value of 5 may be prepared by reacting two molecular proportions of 2-ethyl hexyl alcohol, six molecular proportions of a mixture of sebacic and phthalic acids and five molecular proportions of propylene glycol.

It has been found particularly advantageous to use mixtures of aliphatic and aromatic dicarboxylic acids (or anhydrides thereof) in the preparation of the complex esters. Particularly suitable is a mixture of sebacic acid and phthalic acid or anhydride in which the molecular ratio of sebacic acid to phthalic acid or anhydride is 4:1.

In accordance with a further feature of the invention, a fluid lubricant particularly suitable for use in aero gas turbines is obtained if there is added to a blend as above described up to 10% by weight of a polymer of a suitable ester of acrylic or methacrylic acids. Suitable polymers are sold under the registered trademark "Acryloid."

In accordance with yet a further feature of the invention, a fluid lubricant having increased shear stability is obtained by using the complex ester in blend with a mixture of different aliphatic dicarboxylic acid diesters, particularly with a mixture of dioctyl and dinonyl sebacates, or in blend with a mixed diester of an aliphatic dicarboxylic acid, particularly octyl-nonyl sebacate, or in blend with a mixture of simple and mixed diesters.

Any suitable anti-oxidant may be incorporated in the blend if desired.

Suitable complex esters or complex ester mixtures for use in lubricant blends according to the invention were prepared as follows.

COMPLEX ESTER A was prepared from the following ingredients:

Sebacic acid _____ 485 gm. (2.4 moles)
Phthalic anhydride _____ 89 gm. (0.6 mole)
2-ethyl hexyl alcohol _____ 117 gm. (0.9 mole)
Propylene glycol _____ 216 gm. (2.85 moles)

The reactants were placed in a three necked flask fitted with a thermometer, a delivery tube for nitrogen gas and a condenser fitted with a vacuum take-off arm and flask for collecting the distillate. Before reaction the apparatus was flushed out with dry nitrogen and during reaction nitrogen was bubbled through the liquid reaction mass to maintain adequate agitation.

The following heating cycle was carried out (all temperatures were measured internally):

4 hours at 130° C.
2 hours at 150° C.
2 hours at 180° C.

The total distillate from these three stages was collected and the upper layer which was predominantly 2-ethyl hexyl alcohol was returned to the reaction flask. The lower layer consisting of water containing a little dissolved propylene glycol was weighed and the mass of glycol present determined by either a density determination or a refractive index measurement. A quantity of propylene glycol equivalent to this determined quantity was then placed in the flask and reaction continued as follows:

3 hours at 230° C.

The delivery tube for nitrogen gas was then replaced by a capillary tube connected to the nitrogen source and the reaction continued under a vacuum of approximately 12 mm. Hg, and at a temperature of 250° C. until the acid value of the product fell below 5 mg. KOH/gm. The product was then filtered. The complex ester had the following characteristics:

Acid value_____ 2.8 mg. KOH/gm.
Viscosity at 25° C_____ 3560 centistokes

The product consisted of a mixture of molecules of the general formula given above in which $n$ had an average value of between 5 and 6.

COMPLEX ESTER B

The complex ester was prepared from the following ingredients:

Sebacic acid_____ 485 gm. (2.4 moles)
Phthalic anhydride_____ 89 gm. (0.6 mole)
2-ethyl hexyl alcohol_____ 273 gm. (2.1 moles)
Propylene glycol_____ 171 gm. (2.25 moles)

The reactants placed in a three-necked flask fitted with a thermometer, a delivery tube for nitrogen gas and a condenser fitted with a vacuum take-off arm and flask for collecting the distillate. Before reaction the apparatus was flushed out with dry nitrogen and during reaction nitrogen was bubbled through the liquid reaction mass to maintain adequate agitation.

The following heating cycle was carried out (all temperatures measured internally):

6 hours at 130° C.
6 hours at 150° C.
6 hours at 180° C.
6 hours at 230° C.

In this reaction, the total distillate, which consisted of approximately 50 ml. of 2-ethyl hexyl alcohol and 100 ml. of an aqueous layer, was discarded. The nitrogen tube was then replaced by a capillary tube connected to the nitrogen cylinder and the reaction continued at 250° C. under an applied vacuum of approximately 12 mm. Hg until the acid value had fallen below 5 mg. KOH/gm. The product was then filtered.

The complex ester had the following characteristics:

Acid value_____ 4.45 mg. KOH/gm.
Viscosity at 25° C_____ 390 centistokes

The product consisted of a mixture of molecules of the general formula given above in which $n$ had an average value of about 3. By using initially 2-ethyl hexyl alcohol in an amount 40% in excess of that required for obtaining a product with an average $n$ value of 3 it was not necessary to recover and re-use the 2-ethyl hexyl alcohol lost during the heating.

The following are examples of lubricant blends according to the invention (parts by weight).

*Example 1*

| | Percent |
|---|---|
| Dinonyl sebacate | 78.5 |
| Complex ester B | 17.0 |
| Acryloid HF 825 | 4.5 |

This blend had a pour point below −40° F., a viscosity at −40° F. (after cooling to −65° F.) of 14,700 centistokes, and satisfactory heat stability. The heat stability is satisfactory if there is not more than 5% loss after heating at 300° C. for 30 minutes and if the residue is soluble in fresh oil.

*Example 2*

| | Percent |
|---|---|
| Dinonyl sebacate | 45.5 |
| Dioctyl sebacate | 27.5 |
| Complex ester B | 22.5 |
| Acryloid HF 825 | 4.5 |

This blend had a pour point below −40° F., a viscosity at −40° F. (after cooling to −65° F.) of 12,000 centistokes, and satisfactory heat stability.

*Example 3*

| | Percent |
|---|---|
| Octyl nonyl sebacate | 78.3 |
| Complex ester A | 10.8 |
| Complex ester B | 8.0 |
| Acryloid HF 825 | 2.9 |

This blend had a viscosity of 7.65 centistokes at 210° F. and 8830 centistokes at −40° F.

*Example 4*

| | Percent |
|---|---|
| Octyl nonyl sebacate | 70.7 |
| Complex ester A | 2.9 |
| Complex ester B | 23.5 |
| Acryloid HF 825 | 2.9 |

This blend had a viscosity of 7.68 centistokes at 210° F. and 10,000 centistokes at −40° F.

*Example 5*

| | Percent |
|---|---|
| Dioctyl sebacate | 55 |
| Complex ester B | 45 |

This blend had a viscosity at −40° F. of 22,000 centistokes.

*Example 6*

| | Percent |
|---|---|
| Dinonyl sebacate | 66 |
| Complex ester B | 34 |

This blend had a viscosity at −40° F. of 26,000 centistokes.

Although only one method of preparation of the complex esters has been given, they can, of course, be prepared by other methods e.g. the glycol half-ester method in which the acid and glycol are first reacted together under suitable conditions to produce a compound of the formula

HOOCR$_1$COO(R$_2$OOCR$_1$COO)$_n$H and the terminal acid groups are reacted with monohydric alcohol.

It is to be understood that no claim is made per se to the complex esters herein referred to or to their method of preparation.

We claim:

1. A lubricating composition consisting essentially of a blend of at least one diester selected from the group consisting of octyl nonyl sebacate, dioctyl sebacate and dinonyl sebacate, and at least one complex ester of the formula:

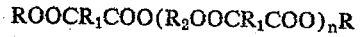

ROOCR$_1$COO(R$_2$OOCR$_1$COO)$_n$R where R is an alkyl group having 8 carbon atoms, at least one R$_1$ is a phenylene group (C$_6$H$_4$<) the remaining R's being octamethylene groups (—(CH$_2$)$_8$—), R$_2$ is an alkylene group containing 3 carbon atoms and $n$ is an integer from 2–10, said diester being in an amount from about 55% to about 78.5% by weight of said blend.

2. A lubricating composition according to claim 1 in which R is 2-ethylhexyl.

3. A lubricating composition according to claim 1 in which R$_2$ is methyl ethylene (—CH(CH$_3$)CH$_2$—).

4. A lubricating composition according to claim 1 in which the ratio of aliphatic R's to aromatic R's in the complex esters is 4:1.

References Cited in the file of this patent

UNITED STATES PATENTS

| | | |
|---|---|---|
| 2,075,107 | Frazier | Mar. 30, 1937 |
| 2,499,984 | Beavers et al. | Mar. 7, 1950 |
| 2,575,196 | Smith | Nov. 13, 1951 |
| 2,628,974 | Sanderson | Feb. 17, 1953 |
| 2,820,815 | Matuszak et al. | Jan. 21, 1958 |

FOREIGN PATENTS

| | | |
|---|---|---|
| 687,347 | Great Britain | Feb. 11, 1953 |

OTHER REFERENCES

"Ind. and Eng. Chem.," April 1947, vol. 39, No. 4, pp. 485 and 487.

Ind. and Eng. Chem., vol. 42, December 1950, pp. 2415–2420.

UNITED STATES PATENT OFFICE
CERTIFICATE OF CORRECTION

Patent No. 2,937,996                                                       May 24, 1960

Samuel R. Pethrick et al.

It is hereby certified that error appears in the above numbered patent requiring correction and that the said Letters Patent should read as corrected below.

Column 4, line 70, and column 5, line 4, each occurrence, for "R's" read -- $R_1$s --.

Signed and sealed this 24th day of October 1961.

(SEAL)
Attest:

ERNEST W. SWIDER                                               DAVID L. LADD
Attesting Officer                                               Commissioner of Patents

USCOMM-DC